Patented Apr. 27, 1943

2,317,739

UNITED STATES PATENT OFFICE 2,317,739

REACTION PRODUCT OF ALDEHYDES AND TRIAZINYL CYANOALKYL SULPHIDES

Gaetano F. D'Alelio and James W. Underwood, Pittsfield, Mass., assignors to General Electric Company, a corporation of New York No Drawing. Application June 27, 1941,
Serial No. 400,149

18 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a triazinyl cyanoalkyl sulphide corresponding to the following general formula:

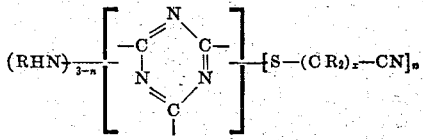

In the above formula $n$ represents an integer and is at least 1 and not more than 3, $x$ is an integer and is at least 1 and not more than 2, and R represents a member of the class consisting of hydrogen and monovalent hydrocarbon and halohydrocarbon radicals, numerous examples of which hereafter are given. Since $x$ represents an integer which is 1 or 2, it will be seen that the linkage of the cyanoalkyl group to the sulphur atom in all cases will be alpha or beta to the cyano group. It also will be observed that linkage of the triazinyl grouping to the sulphur atom is through a carbon atom. From a consideration of the formula it further will be seen that when $n$ is 3 there will be no amino (—NHR) groups attached to the triazine nucleus. Instead of the s-triazinyl cyanoalkyl sulphides represented by the above formula, corresponding derivatives of the asymmetric triazines or of the vicinal triazines may be used.

Illustrative examples of monovalent hydrocarbon radicals that R in the above formula may represent are aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc. Preferably R is hydrogen.

More specific examples of triazinyl cyanoalkyl sulphides that may be employed in producing our new condensation products are s-triazinyl tri-(cyanomethyl sulphide, s-triazinyl tri-(cyanoethyl sulphide), the monoamino (—NHR) s-triazinyl di-(cyanomethyl sulphides), the monoamino (—NHR) s-triazinyl di-(cyanoethyl sulphides), the diamino [(—NHR)₂] s-triazinyl mono-(cyanomethyl sulphides) and the diamino [(—NHR)₂] s-triazinyl mono-(cyanoethyl sulphides).

The triazinyl cyanoalkyl sulphides that are used in carrying the present invention into effect are more fully described and are specifically claimed in our copending application Serial No. 400,150, filed concurrently herewith, now Patent No. 2,295,561, issued September 15, 1942, and assigned to the same assignee as the present invention.

Other and more specific examples of triazinyl cyanoalkyl sulphides that may be used in producing our new condensation products are listed below:

s-Triazinyl-2,4,6 tri-(beta-cyanoethyl sulphide)
6-amino s-triazinyl-2,4 di-(cyanomethyl sulphide)
6-amino s-triazinyl 2-beta-cyanoethyl 4-cyanomethyl disulphide
4-anilino 6-methylamino s-triazinyl-2 cyanomethyl sulphide
4,6-diamino s-triazinyl-2 beta-cyanoethyl sulphide
6-amino 4-anilino s-triazinyl-2 cyanomethyl sulphide
6-amino 4-anilino s-triazinyl-2 cyano-phenylmethyl sulphide
6-methylamino 4-toluido s-triazinyl-2 beta-cyanoethyl sulphide
4,6-diamino s-triazinyl-2 alpha-cyanoethyl sulphide
4,6-di-(methylamino) s-triazinyl-2 beta-(alpha-cyclohexyl cyanobutyl) sulphide
4,6-di-toluido s-triazinyl-2 beta-(gamma-phenyl cyanopropyl) sulphide
4,6-di-(cyclohexylamino) s-triazinyl-2 alpha-cyanopropyl sulphide
6-naphthylamino s - triazinyl - 2,4 di - alpha-cyanopropyl sulphide)
6-ethylamino s-triazinyl-2,4 di-(cyano-chlorphenylmethyl sulphide)
s-Triazinyl-2,4,6 tri-[beta-(alpha-phenyl cyanobutyl) sulphide]

The formulas for the above compounds are shown in the above-identified copending application Serial No. 400,150.

The present invention is based on our discovery that new and valuable materials of particular utility in the plastics and coating arts can be produced by effecting reaction between ingredients comprising essentially an aldehyde, including polymeric aldehydes and aldehyde-addition products, and certain triazinyl cyanoalkyl sulphides, numerous examples of which have been given above and in our above-identified copending application.

Resins heretofore have been made by condensing an aldehyde with certain thioammeline ethers, but such known resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulphides used in practicing this invention contain aldehyde-reactable nitrilo-thio groups attached to the triazine nucleus, thereby imparting to the condensation products of such sulphides with aldehydes increased heat-, water- and abrasion-resistance and improved curing characteristics as compared with known resinous condensation products of an aldehyde and a thioammeline ether.

In practicing our invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. Condensation products of excellent time- or storage-stability characteristics are obtained by using as the primary catalyst a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the aldehyde, e. g., formaldehyde, and the triazine derivative used in practicing our invention may be carried out in the presence of solvents or diluents, fillers, other natural or synthetic resinous bodies, or while admixed with other materials which also can react with the aldehydic reactant or with the triazine derivative, e. g., ketones, urea, thiourea, selenourea, iminourea, (guanidine), substituted ureas, thioureas, selenoureas and iminoureas, numerous examples of which are given in various copending applications of one of us (Gaetano F. D'Alelio), for instance, in D'Alelio copending application Serial No. 363,037 filed October 26, 1940; monoamides of monocarboxylic and polycarboxylic acids and polyamides of polycarboxylic acids, e. g., acetamide, halogenated acetamides, e. g., a chlorinated acetamide, maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; 5-membered aminotriazines, which compounds also may be named aminotriazoles (amidogentriazoles), and aminotriazines (amidogentriazines), e. g., melamine, ammeline, ammelide, numerous other examples being given in various D'Alelio copending applications, for instance, in D'Alelio copending application Serial No. 377,524, filed Feb. 5, 1941, and in applications referred to in said copending application; aminodiazines and aminodiazoles; phenol and substituted phenols, e. g., the cresols, the xylenols, the tertiary alkyl phenols and other phenols such as mentioned in D'Alelio patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the triazine derivative and the aldehyde by mixing all the reactants and effecting condensation therebetween or by various permutations of the reactants as described, for example, in D'Alelio copending application Serial No. 363,037 with particular reference to reactions involving a urea, an aldehyde and a semi-amide of oxalic acid. For instance, we may form a partial condensation product of ingredients comprising urea, a diamino triazinyl cyanomethyl sulphide and formaldehyde and thereafter effect reaction between this partial condensation product and, for example, a chlorinated acetamide to obtain a heat-curable composition.

Some of the condensation products of this invention are thermoplastic materials even at an advanced stage of condensation while others are thermosetting or potentially thermosetting bodies which convert under heat or under heat and pressure to an insoluble, infusible state. Those materials which are slightly thermoelastic are particularly useful in producing molding compounds suitable for use in making pieces to be molded over screws (as in making bottle caps). The thermoplastic condensation products are of particular utility as plasticizers for other synthetic resins. The thermosetting or potentially thermosetting condensation products, alone or mixed with fillers, pigments, dyes, lubricants, plasticizers, etc., may be used, for example, in the production of molding compositions.

The heat-curable resinous condensation products of this invention show good flow characteristics during a short curing cycle. This is a property that is particularly desirable in a molding compound. The molded resins are of exceptionally light color. Products of any desired colors can be obtained by incorporating a suitable pigment into the molding compound. The molded articles have good surface finish and excellent resistance to water and arcing. They have a high dielectric strength. The pH at which the heat-curable resins of this invention cure generally is of the order of 5.0 to 8.0. Basic fillers such as asbestos, therefore, can be used satisfactorily in the production of molding compounds without detrimental effect upon the rapidity of cure of the compound.

Depending upon the particular reactants employed and the particular conditions of reaction, the intermediate or partial condensation products vary from clear, colorless or colored, syrupy water-soluble liquids to viscous, milky dispersions and gel-like masses of decreased solubility in ordinary solvents, such as alcohol, glycol, glycerine, water, etc. These liquid intermediate condensation products may be concentraetd or diluted further by the removal or addition of volatile solvents to form liquid coating compositions of adjusted viscosity and concentrations. The heat-convertible or potentially heat-convertible resinous condensation products may be used in liquid state, for instance, as surface-coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 4,6-diamino s-triazinyl-2 cyanomethyl sulphide | 72.8 |
| Aqueous formaldehyde (approx. 37.1% HCHO) | 129.6 |
| Sodium hydroxide in 10 parts water | 0.2 | were heated together under reflux at the boiling temperature of the mass for 30 minutes. Upon testing this syrup on a 140° C. hot plate it bodied to a solid resin having a very high fusion point. The addition of a small amount (0.5 part) of sulphamic acid to 115 parts of the resinous syrup, followed by refluxing for an additional 5 minutes to cause the sulphamic acid to intercondense with the partial condensation product of the triazine derivative and formaldehyde, produced a resin that cured rapidly to an insoluble, infusible state. A molding (moldable) compound was prepared by mixing this resinous syrup with 35 parts alpha cellulose in flock form and 0.2 part of a mold lubricant, specifically zinc stearate. The wet compound was dried at 75° C. for 1 hour. A sample of the dried compound was molded for 5 minutes at 130° C. under a pressure of 2,000 pounds per square inch. The molded article was well-cured throughout, had a glossy surface finish and showed good flow characteristics during molding.

Instead of employing sulphamic acid as above described in accelerating the curing of the potentially reactive resinous material, heat-convertible compositions may be produced by adding to the syrup direct or active curing catalysts (e. g., phthalic anhydride, citric acid, etc.), or latent curing catalysts (e. g., sodium chloracetate, N-diethyl chloracetamide, glycine ethyl ester hydrochloride, etc.) or by intercondensation with other curing reactants (e. g., mono-, di- and trichloracetamides, chloracetonitriles, alpha, beta-dibrompropionitrile, aminoacetamide hydrochloride, aminoacetonitrile hydrochloride, ethylene diamine mono-hydrochloride, diethanol amine hydrochloride, nitrourea, glycine, chloracetyl urea, chloracetone, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance, in copending application Serial No. 346,962, filed July 23, 1940, and Serial No. 354,395, filed August 27, 1940, both of which applications are assigned to the same assignee as the present invention.

*Example 2*

| | Parts |
|---|---|
| 4,6-diamino s-triazinyl-2 cyanomethyl sulphide | 72.1 |
| Urea | 108.0 |
| Aqueous formaldehyde (approx. 37.1% HCHO) | 324.0 |
| Sodium hydroxide in 15 parts water | 0.3 | were heated together under reflux for 30 minutes, yielding a resinous syrup that bodied to a thermoplastic resin when a sample was tested on a 140° C. hot plate. A heat-curable resin is produced by incorporating into the syrupy solution or into the solid resin active or latent curing catalysts or by intercondensation with curing reactants as described under Example 1.

Five-tenths (0.5) part sulphamic acid was added to 230 parts of the above syrup and the mixture was heated under reflux for two minutes. The resulting hot syrup was mixed with 70 parts alpha flock and 0.4 part zinc stearate to form a molding compound. The wet compound was dried at 75° C. for two hours. A well-cured molded piece was produced by molding a sample of the dried compound for 5 minutes at 130° C. under a pressure of 2,000 pounds per square inch.

*Example 3*

| | Parts |
|---|---|
| 4,6-diamino s-triazinyl-2 cyanomethyl sulphide | 9.0 |
| Phenol, synthetic | 90.0 |
| Aqueous formaldehyde (approx. 37.1% HCHO) | 195.0 |
| Potassium carbonate in 10 parts water | 2.85 |

A partial condensation product of phenol and formaldehyde was produced by heating together the above-stated amounts of phenol and formaldehyde in the presence of the potassium carbonate for 3½ hours at 65°-70° C. The triazine derivative was now added and the mixture was heated under reflux for 45 minutes to cause the triazine derivative to react with the phenol-formaldehyde partial condensation product. The resulting resinous syrup was acidified by adding 5 parts oxalic acid dissolved in 20 parts water. The acidified syrup cured to an insoluble, infusible state when a small sample of it was tested on a 140° C. hot plate.

A molding compound was prepared by mixing the acidified syrup with 114 parts alpha cellulose and 1 part zinc stearate. The wet compound was dried for 3 hours at 75° C. A well-cured molded article was produced by pressing a sample of the dried compound for 5 minutes at 130° C. under a pressure of 2,000 pounds per square inch. The molded piece had excellent cohesive properties and showed good flow characteristics during molding.

*Example 4*

| | Parts |
|---|---|
| 4,6-diamino s-triazinyl-2 cyanomethyl sulphide | 18.2 |
| Furfural | 57.6 |
| Sodium hydroxide in 5 parts water | 0.1 |
| Water | 100.0 | were heated together under reflux for 30 minutes. A heat-curable resin is produced by incorporating into the syrupy mass active or latent curing catalysts or curing reactants as described under Example 1. The resulting product is suitable for use in the production of molding compounds. This resin is especially suitable for use when products of light color are of secondary consideration.

*Example 5*

| | Parts |
|---|---|
| 4,6-diamino s-triazinyl-2 cyanomethyl sulphide | 18.2 |
| Acrolein | 33.6 |
| Sodium hydroxide in 5 parts water | 0.1 |

The above components were heated together under reflux for 30 minutes, yielding a thick resinous mass. When a sample of this resin was heated on a 140° C. hot plate it cured to an infusible state. A more rapidly curing resin is produced by the use of, for example, citric acid, glycine or other direct or latent curing catalysts or curing reactants such as described under Example 1. The cured resin is extremely resistant to attack by water.

*Example 6*

| | Parts |
|---|---|
| 4,6-diamino s-triazinyl-2 cyanomethyl sulphide | 18.2 |
| Butyl alcohol | 74.0 |
| Aqueous formaldehyde (approx. 37.1% HCHO) | 81.0 |
| Sodium hydroxide in 10 parts water | 0.2 | were heated together under reflux for 45 minutes, yielding a clear syrup. When this syrup was dehydrated by heating it at 100°–120° C., a viscous resinous mass soluble in Solvatone was obtained. A solid resin having a very high fusion point was produced by heating the dehydrated resin further at 140° C. A thermosetting resinous composition is obtained by incorporating into the syrupy solution, or into the thermoplastic resin, active or latent curing catalysts or curing reactants as described under Example 1. The solubility and film-forming characteristics of this resin make it especially suitable for use in the production of spirit and baking varnishes. Thus it may be used, for example, as a modifier of varnishes of the aminoplast and alkyd-resin types.

*Example 7*

| | Parts |
|---|---|
| 4,6-diamino s-triazinyl-2 cyanomethyl sulphide | 18.2 |
| Diethyl malonate | 16.0 |
| Aqueous formaldehyde (approx. 37.1% HCHO) | 64.8 |
| Sodium hydroxide in 5 parts water | 0.1 | were heated together under reflux for 30 minutes, yielding a thick syrupy resinous mass. The addition of active or latent curing catalysts or curing reactants as described under Example 1 yields a heat-curable resinous composition. The unmodified, uncured resin was found to be insoluble in water and in alcohols but was soluble in Solvatone.

*Example 8*

| | Parts |
|---|---|
| 4,6-diamino s-triazinyl-2 cyanomethyl sulphide | 18.2 |
| Acetamide | 5.9 |
| Aqueous formaldehyde (approx. 37.1% HCHO) | 56.7 |
| Sodium hydroxide in 5 parts water | 0.1 | were heated together under reflux for 30 minutes, yielding a syrupy mass that was converted into a thermoplastic resin when dehydrated at 140° C. A heat-hardenable resin is produced by incorporating active or latent curing catalysts or curing reactants, such as described under Example 1, either into the syrupy solution or into the thermoplastic resin.

*Example 9*

| | Parts |
|---|---|
| 4,6-diamino s-triazinyl-2 cyanomethyl sulphide | 18.2 |
| Glycerine | 9.2 |
| Aqueous formaldehyde (approx. 37.1% HCHO) | 64.8 |
| Sodium hydroxide in 5 parts water | 0.1 |

The above components were heated together under reflux for 30 minutes to yield a clear syrup that bodied to a thermoplastic resin when dehydrated at 140° C. Heat-curable products are obtained by adding active or latent curing catalysts or by intercondensation with curing reactants as described under Example 1. The glycerine internally plasticizes the resinous mass, yielding products of higher plastic flow than compositions similarly prepared in the absence of glycerine. The heat-curable products of this example cure more slowly to an insoluble, infusible state than do the glycerine-free resins. Because of their flow and curing characteristics, the resinous compositions of this example and of the preceding example would be especially suitable for use in modifying rapidly curing resins to control their curing characteristics.

*Example 10*

| | Parts |
|---|---|
| 4,6-diamino s-triazinyl-2 cyanomethyl sulphide | 18.2 |
| Polyvinyl alcohol | 26.4 |
| Aqueous formaldehyde (approx. 37.1% HCHO) | 97.2 |
| Sodium hydroxide in 5 parts water | 0.1 |
| Water | 200.0 | were heated together under reflux for 30 minutes. The resulting syrupy mass formed a thermoelastic film when a small sample of it was heated on a 140° C. hot plate. This syrup is suitable for use in the manufacture of baking varnishes. When a sample of the syrup was treated with a curing agent, specifically a small amount of hydrochloric acid, and the resulting product baked in film form on a glass surface for several hours at 75°–80° C., a baked film that was transparent, tough and not attacked by water was obtained. The resinous composition of this example also may be used in the preparation of molding compounds after incorporating therein active or latent curing catalysts or curing reactants as described under Example 1.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, selenourea and iminourea, and of substituted ureas, thioureas, selenoureas and iminoureas (numerous examples of which are given in D'Alelio copending application Serial No. 377,524, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in D'Alelio copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mixtures of aldehydes and aldehyde-addition products may be employed, e. g., mixtures of formaldehyde and methylol compounds such, for instance, as dimethylol urea and trimethylol melamine.

The ratio of the aldehydic reactant to the triazine derivative may be varied over a wide range, but ordinarily the reactants are employed in an amount corresponding to at least one mol of the aldehyde, specifically formaldehyde, for each mol of the triazine derivative. Thus we may use, for example, from one to five or six mols of an aldehyde for each mol of triazine derivative. When the aldehyde is available for reaction in the form of an alkylol derivative, more particularly a methylol derivative such, for instance, as dimethylol urea, trimethylol melamine, etc., then higher amounts of such aldehyde-addition products ordinarily are used, for example, up to 10 or 12 mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulphonamides, benzene disulphonamides, benzene trisulphonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloracetonitriles, etc.; and others.

The modifying bodies also may take the form of high molecular weight bodies with or without resinous characteristics, for example, hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminodiazines (e. g., 2,4,6-triaminopyrimidine, 2,4-diaminoquinazoline, etc.), or with aminotriazines other than those with which this invention is concerned, or with the aminodiazoles, alone or admixed with, for example urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a triazinyl cyanoalkyl sulphide of the kind herein described and an aldehyde, e. g., formaldehyde, we may cause an aldehyde to condense with a salt of the triazine derivative or with a mixture of the triazine derivative and a salt (organic or inorganic) thereof. As examples of salts of the triazine derivatives that may be used, we mention salts of (1) triazine derivatives of the class consisting of monoamino (—NHR) and diamino [(—NHR)$_2$] triazinyl cyanomethyl and cyanoethyl sulphides and (2) organic or inorganic acids as, for instance, hydrochloric, sulphuric, phosphoric, boric, acetic, chloracetic, propionic, butyric, valeric, acrylic, polyacrylic, methacrylic, polymethacrylic, oxalic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100°–200° C. and at pressures of the order of 1,000 to 5,000 pounds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a triazinyl cyanoalkyl sulphide corresponding to the general formula

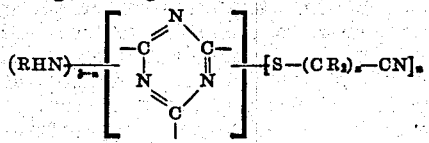

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

2. A composition as in claim 1 wherein the aldehyde is formaldehyde.

3. A composition comprising a condensation product of ingredients comprising an aldehyde and a triazinyl cyanoalkyl sulphide corresponding to the general formula

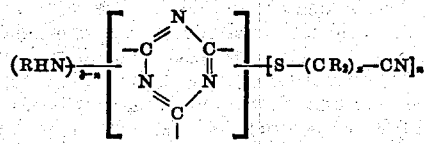

where $n$ is an integer and is at least 1 and not more than 3, $x$ is an integer and is at least 1 and not more than 2, and R represents hydrogen.

4. A composition comprising a condensation product of ingredients comprising formaldehyde and a triazinyl cyanoalkyl sulphide corresponding to the general formula

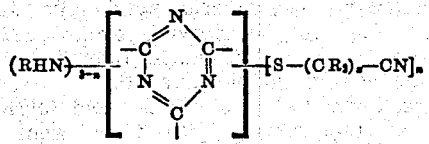

where $n$ is an integer and is at least 1 and not more than 3, R represents hydrogen and $x$ is 1.

5. A composition comprising the product of reaction of ingredients comprising symmetrical triazinyl-2,4,6 tri-(cyanomethyl sulphide) and an aldehyde.

6. A resinous composition comprising the product of reaction of ingredients comprising a monoamino s-triazinyl di-(cyanomethyl sulphide) and an aldehyde.

7. A resinous composition comprising the product of reaction of ingredients comprising a diamino s-triazinyl cyanomethyl sulphide and an aldehyde.

8. A resinous composition comprising the product of reaction of ingredients comprising formaldehyde and 4,6-diamino s-triazinyl-2 cyanomethyl sulphide.

9. A heat-curable resinous condensation product of ingredients comprising formaldehyde and a triazinyl cyanoalkyl sulphide corresponding to the general formula

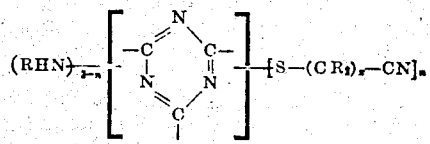

where $n$ is an integer and is at least 1 and not more than 3, R represents hydrogen and $x$ is 1.

10. A product comprising the cured resinous condensation product of claim 9.

11. A composition as in claim 1 wherein the reaction product is an alkaline-catalyzed reaction product of the stated components.

12. A composition as in claim 1 wherein the reaction product is an alcohol-modified reaction product of the stated components.

13. A composition comprising the product of reaction of ingredients comprising urea, a diamino s-triazinyl cyanomethyl sulphide and an aldehyde.

14. A composition comprising the product of reaction of ingredients comprising melamine, a diamino s-triazinyl cyanomethyl sulphide and formaldehyde.

15. A composition comprising the product of reaction of ingredients comprising a phenol, an aldehyde and a triazinyl cyanoalkyl sulphide corresponding to the general formula

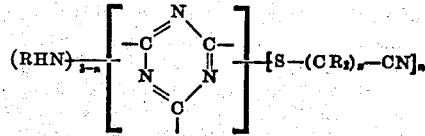

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

16. A heat-curable composition comprising the heat-convertible product of reaction of (1) a partial condensation product of ingredients comprising urea, a diamino s-triazinyl cyanomethyl sulphide and formaldehyde and (2) a chlorinated acetamide.

17. A product comprising the cured composition of claim 16.

18. The method of preparing new condensation products which comprises effecting reaction between ingredients comprising an aldehyde and a triazinyl cyanoalkyl sulphide corresponding to the general formula

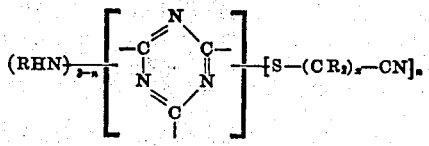

where $n$ is an integer and is at least 1 and not more than 3, $x$ is an integer and is at least 1 and not more than 2, and R is a member of the class consisting of hydrogen and monovalent hydrocarbon and halo-hydrocarbon radicals.

GAETANO F. D'ALELIO.
JAMES W. UNDERWOOD.